J. E. Buxton,
Seeder.
No. 112,540.                    Patented Mar. 14, 1871.
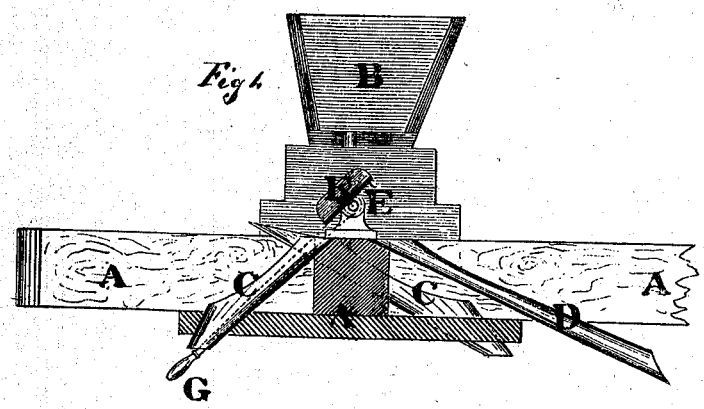
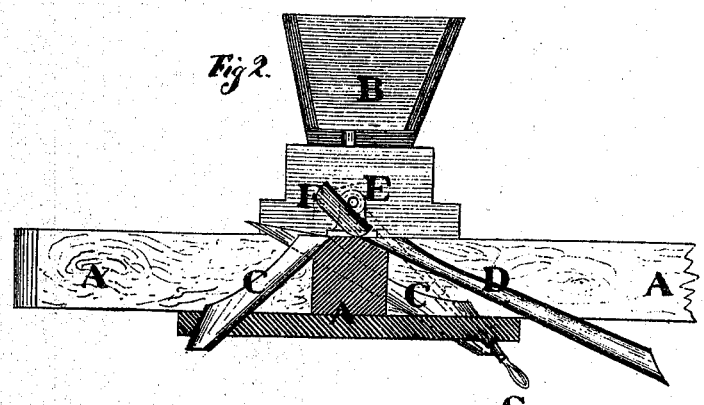
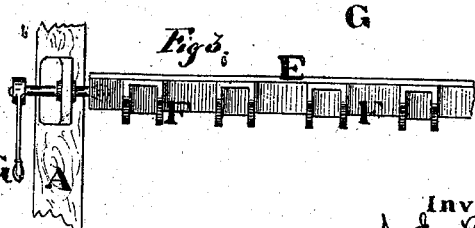
Witnesses
A. Bernstein
Wm. C. Harwell
Inventor
J. E. Buxton
By Farwell, Lieswarti & Co.
Attorneys

United States Patent Office.

JOHN E. BUXTON, OF OWATONNA, MINNESOTA.

Letters Patent No. 112,540, dated March 14, 1871.

---

IMPROVEMENT IN COMBINED DRILLS AND SEEDERS.

---

The Schedule referred to in these Letters Patent and making part of the same.

---

*To all whom it may concern:*

Be it known that I, JOHN E. BUXTON, of Owatonna, in the county of Steele and State of Minnesota, have invented a new and useful Improvement in Combined Drill and Seeder; and I do hereby declare the following to be a full, clear, and exact description thereof, which will enable others skilled in the art to which my invention appertains to make and use the same, reference being had to the accompanying drawings forming part of this specification, in which—

Figure 1 is a detail vertical longitudinal section of a seeding-machine, adjusted for drilling grain.

Figure 2 is a similar view of the machine, adjusted for sowing broadcast.

Figure 3 is a detail plan view of the adjustable conveyers and guide, by which the machine is adapted for use either as a grain-drill or broadcast seeder.

Similar letters of reference indicate corresponding parts in the several figures of the drawings.

My invention has for its object to improve the means for converting a seeding-machine either into a grain-drill or broadcast seeder.

To this end it consists in an apron interposed between the hopper and discharge-spouts, provided upon one side with conveyer-spouts, and adapted to be oscillated in bearings affixed to the frame of the machine in such a manner that when the conveyers are uppermost the grain from the hopper shall be guided into the drill-spouts, and when the plain surface is uppermost the grain shall be directed into the broadcast spouts.

In the accompanying drawings—

A is the frame of the machine, to which the cultivator-teeth, hoes, or plows are attached in the usual manner. It may be mounted upon wheels or not, as desired.

B is the seed-hopper, placed transversely upon the frame, and provided with holes through the bottom at such distances apart as it is desired to have between the drills.

C are the drill-spouts, placed transversely of the frame, beneath the hopper, in inclined positions alternately to the front and rear, and so arranged as to register with the holes in the bottom of the hopper.

D are the broadcast-sowing spouts, also arranged beneath the hopper transversely of the frame, and inclined to the front, as shown.

These devices are all described in a patent granted to me July 6, 1869, and numbered 92,262, and do not, therefore, constitute the present invention.

E is an apron or strip of metal or other suitable material interposed between the bottom of the hopper and the upper ends of the spouts C D, and hung in bearings affixed to the sides of the frame A, as shown. It is provided upon one side with a series of conveyer-spouts, F, open at both ends, and arranged to direct the seed from the hopper into the drill-spouts C.

The apron is arranged to turn in its bearings, and one of its journals is provided with a downward-projecting lever, G, which, when moved to occupy the position shown in fig. 1, will turn the apron to hold the conveyer-spouts F uppermost. In this position the grain falling from the hopper will be directed into the drill-spouts and drilled into the ground in the usual manner.

When it becomes necessary or desirable to sow the seed broadcast the lever is moved to the position shown in fig. 2, when the plain surface of the apron will be uppermost in a slightly inclined position, and direct the grain into the broadcast spouts D. Scatterers may be affixed to the discharge ends of the scattering-spouts or to the frame in front of their discharge ends, to scatter the grain evenly over the ground.

The apron E and its conveyers may be operated by means other than the lever, if found preferable.

By my improvement the seed is directed into the drill-spouts in streams, but into the broadcast spouts in a broad sheet equal or nearly so to the length of the apron, and is consequently discharged equally from all the broadcast spouts and sown evenly upon the ground.

Having thus described my invention,

What I claim as new, and desire to secure by Letters Patent, is—

The oscillating apron E, provided upon one side with the conveyer-spouts F, and arranged for operation between the bottom of the hopper and the spouts C D, in such manner as to discharge the grain into the drill-spouts in steams and into the broadcast spouts in a sheet, substantially as herein shown and described, for the purpose specified.

The above specification of my invention signed by me this 27th day of September, 1869.

J. E. BUXTON.

Witnesses:
A. BERNSTEIN,
WM. C. FARWELL.